(12) United States Patent
DeCamp

(10) Patent No.: US 9,904,323 B2
(45) Date of Patent: *Feb. 27, 2018

(54) POWER AND DATA ADAPTER, AND RELATED SYSTEMS AND METHODS

(71) Applicant: Targus International LLC, Anaheim, CA (US)

(72) Inventor: Ronald DeCamp, Long Beach, CA (US)

(73) Assignee: TARGUS INTERNATIONAL LLC, Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,833

(22) Filed: Oct. 27, 2015

(65) Prior Publication Data

US 2016/0231777 A1    Aug. 11, 2016

Related U.S. Application Data

(60) Provisional application No. 62/069,561, filed on Oct. 28, 2014.

(51) Int. Cl.
*H04B 1/00* (2006.01)
*G06F 1/16* (2006.01)
(Continued)

(52) U.S. Cl.
CPC .......... *G06F 1/1632* (2013.01); *G06F 1/266* (2013.01); *H02J 4/00* (2013.01); *H04B 1/3827* (2013.01)

(58) Field of Classification Search
CPC .......... G06F 1/1632; G06F 1/26; G06F 1/266; H02J 2007/0062; H02J 4/00; H02J 7/0027;
(Continued)

(56) References Cited

U.S. PATENT DOCUMENTS

| | | |
|---|---|---|
| 5,835,733 A | 11/1998 | Walsh et al. |
| 5,886,424 A | 3/1999 | Kim |

(Continued)

FOREIGN PATENT DOCUMENTS

| | | |
|---|---|---|
| AU | 2014100171 A4 | 3/2014 |
| GB | 2 457 252 A | 8/2009 |

(Continued)

OTHER PUBLICATIONS

International Search Report and Written Opinion for PCT/US2012/023717 filed Feb. 3, 2012, and dated Aug. 30, 2012, 9 pgs.

(Continued)

*Primary Examiner* — Wen Huang
(74) *Attorney, Agent, or Firm* — Stoel Rives LLP

(57) ABSTRACT

Adapters and related systems and methods are disclosed. An adapter includes a power input, a data interface, and a universal non-proprietary data and power interface. The adapter is configured to relay communications between a portable electronic device communicatively coupled to the universal non-proprietary data and power interface and a docking station communicatively coupled to the data interface, and provide power to the electronic device through the universal non-proprietary data and power interface. A system includes the adapter. A method includes transmitting power to the portable electronic device through the universal non-proprietary data and power interface, and relaying data communications between the portable electronic device and the docking station through the universal non-proprietary data and power interface.

20 Claims, 3 Drawing Sheets

(51) Int. Cl.
*H04B 1/3827* (2015.01)
*H02J 4/00* (2006.01)
*G06F 1/26* (2006.01)

(58) Field of Classification Search
CPC ...... H02J 7/025; H02J 7/0044; H04B 1/3827; H04M 1/72527; H04M 1/04; Y10T 307/25
See application file for complete search history.

(56) References Cited

U.S. PATENT DOCUMENTS

| | | |
|---|---|---|
| 6,170,026 B1 | 1/2001 | Kimura et al. |
| 6,604,199 B1 | 8/2003 | Yang et al. |
| 6,976,885 B2 | 12/2005 | Lord |
| 7,035,126 B1 | 4/2006 | Lanni |
| 7,103,760 B1 | 9/2006 | Billington et al. |
| 7,201,611 B2 | 4/2007 | Faranda |
| 7,643,283 B2 | 1/2010 | Jubelirer et al. |
| 7,683,573 B2 | 3/2010 | Nikazm et al. |
| 7,899,970 B2 | 3/2011 | Mori |
| 7,976,337 B1 | 7/2011 | Cortopassi et al. |
| 8,990,469 B2 | 3/2015 | Benhard et al. |
| 2002/0119800 A1 | 8/2002 | Jaggers et al. |
| 2003/0084222 A1 | 5/2003 | Wurzburg |
| 2003/0107566 A1* | 6/2003 | Shin .................. G06F 1/266 345/212 |
| 2004/0064621 A1 | 4/2004 | Dougherty et al. |
| 2004/0088465 A1 | 5/2004 | Bianchi |
| 2004/0095713 A1 | 5/2004 | Chuang |
| 2004/0116149 A1 | 6/2004 | Yukie et al. |
| 2004/0212586 A1 | 10/2004 | Denny, III |
| 2005/0162824 A1 | 7/2005 | Thompson |
| 2005/0164545 A1 | 7/2005 | Rosenthal et al. |
| 2005/0180086 A1 | 8/2005 | Schaefer et al. |
| 2006/0005055 A1 | 1/2006 | Potega |
| 2006/0075286 A1 | 4/2006 | Hodge et al. |
| 2006/0095641 A1 | 5/2006 | Pandit et al. |
| 2006/0161713 A1 | 7/2006 | Belady |
| 2006/0205381 A1 | 9/2006 | Beart et al. |
| 2006/0250764 A1 | 11/2006 | Howarth et al. |
| 2007/0054550 A1* | 3/2007 | Cuthbert .............. H01R 29/00 439/607.01 |
| 2007/0070598 A1 | 3/2007 | Chuang |
| 2007/0101039 A1 | 5/2007 | Rutledge et al. |
| 2007/0168593 A1 | 7/2007 | Montag et al. |
| 2008/0053770 A1 | 3/2008 | Tynyk |
| 2008/0119241 A1 | 5/2008 | Dorogusker et al. |
| 2008/0194119 A1 | 8/2008 | Mori |
| 2008/0239681 A1 | 10/2008 | Iida |
| 2009/0058359 A1 | 3/2009 | Fischer et al. |
| 2009/0066704 A1 | 3/2009 | Daniel et al. |
| 2009/0072782 A1 | 3/2009 | Randall |
| 2009/0079264 A1* | 3/2009 | Minami ................ G06F 1/266 307/44 |
| 2009/0158423 A1 | 6/2009 | Orlassino et al. |
| 2009/0177906 A1* | 7/2009 | Paniagua, Jr. ............ G06F 1/26 713/340 |
| 2009/0228614 A1 | 9/2009 | Hwang |
| 2009/0309748 A1 | 12/2009 | Elgort et al. |
| 2010/0066685 A1 | 3/2010 | Cain et al. |
| 2010/0081473 A1 | 4/2010 | Chatterjee et al. |
| 2010/0128766 A1 | 5/2010 | Sugita |
| 2010/0188808 A1 | 7/2010 | Howarth et al. |
| 2010/0251361 A1 | 9/2010 | Collopy et al. |
| 2010/0259213 A1 | 10/2010 | Maharaj |
| 2010/0295384 A1 | 11/2010 | Kobayashi |
| 2011/0145466 A1 | 6/2011 | Supran et al. |
| 2011/0179291 A1* | 7/2011 | Weng .................. G06F 1/26 713/300 |
| 2011/0204843 A1 | 8/2011 | Foster |
| 2011/0208980 A1* | 8/2011 | Brooks .................. G06F 1/266 713/300 |
| 2011/0239008 A1* | 9/2011 | Lam .................. G06F 13/409 713/300 |
| 2011/0266997 A1 | 11/2011 | Krancher et al. |
| 2012/0034951 A1 | 2/2012 | Jones, III et al. |
| 2012/0054400 A1 | 3/2012 | Iverson et al. |
| 2012/0068538 A1 | 3/2012 | Ye et al. |
| 2012/0081087 A1* | 4/2012 | Ching-Wei .............. G06F 1/266 323/282 |
| 2012/0155013 A1 | 6/2012 | Huang |
| 2013/0205060 A1* | 8/2013 | Benhard ................ H02J 7/0027 710/303 |
| 2014/0181350 A1* | 6/2014 | Pedro .................. G06F 13/4077 710/313 |
| 2014/0208134 A1* | 7/2014 | Waters .................. G06F 13/385 713/310 |
| 2014/0244869 A1 | 8/2014 | Adrian et al. |
| 2014/0301575 A1 | 10/2014 | Holtman et al. |
| 2014/0342669 A1 | 11/2014 | Zeung et al. |
| 2014/0359318 A1 | 12/2014 | Liu et al. |
| 2015/0082061 A1* | 3/2015 | Ramirez ................ G06F 1/1632 713/323 |
| 2015/0106814 A1 | 4/2015 | Vilke et al. |
| 2015/0237191 A1 | 8/2015 | Moran et al. |
| 2015/0295440 A1 | 10/2015 | Liao |
| 2015/0346792 A1* | 12/2015 | Rathi ...................... G06F 1/266 713/310 |
| 2015/0356045 A1 | 12/2015 | Soffer |
| 2016/0173678 A1 | 6/2016 | DeCamp |
| 2016/0187963 A1* | 6/2016 | Leinonen ............ H04L 12/6418 710/313 |

FOREIGN PATENT DOCUMENTS

| | | |
|---|---|---|
| WO | WO 03/030304 A2 | 4/2003 |
| WO | 2005003983 A1 | 1/2005 |
| WO | WO 2008/109193 A1 | 9/2008 |
| WO | WO 2013/033573 A2 | 3/2013 |

OTHER PUBLICATIONS

International Preliminary Report on Patentability for PCT/US2012/023717 filed Feb. 3, 2012, and dated Aug. 15, 2013, 6 pgs.
Fink, Thomas, "Toshiba Dynadock V Review," Aug. 9, 2010, Laptop Magazine, retrieved from the Internet on Dec. 21, 2013, at <http://www.laptopmag.com/review/accessories/toshiba-dynadock-v.aspx>, pp. 1-2.
International Search Report and Written Opinion for PCT/US2014/017434 filed Feb. 20, 2014, and mailed from International Searching Authority dated Jun. 30, 2014, 13 pgs.
Non-Final Office Action for U.S. Appl. No. 13/786,038, filed Mar. 5, 2013 and mailed from USPTO dated Sep. 18, 2014, 24 pgs.
Notice of Allowance and Fee(s) Due for U.S. Appl. No. 13/365,754, filed Feb. 3, 2012, and mailed from the USPTO dated Feb. 4, 2015, 8 pgs.
Non-Final Office Action for U.S. Appl. No. 13/365,754, filed Feb. 3, 2012, and mailed from the USPTO dated Sep. 10, 2013, 15 pgs.
Final Office Action for U.S. Appl. No. 13/365,754, filed Feb. 3, 2012, and mailed from the USPTO dated Dec. 27, 2013, 18 pgs.
Non-Final Office Action for U.S. Appl. No. 13/365,754, filed Feb. 3, 2012, and mailed from the USPTO dated May 13, 2014, 18 pgs.
Final Office Action for U.S. Appl. No. 13/365,754, filed Feb. 3, 2012, and mailed from the USPTO dated Jun. 10, 2014, 22 pgs.
Non-Final Office Action for U.S. Appl. No. 13/365,754, filed Feb. 3, 2012, and mailed from the USPTO dated Sep. 17, 2014, 25 pgs.
Non-Final Office Action for U.S. Appl. No. 14/970,318, filed Dec. 15, 2015, and mailed from the USPTO dated Feb. 6, 2017, 21 pgs.
Non-Final Office Action for U.S. Appl. No. 14/634,196, filed Feb. 27, 2015, and mailed from USPTO dated Sep. 7, 2016, 25 pgs.
Non-Final Office Action for U.S. Appl. No. 14/970,318, filed Dec. 15, 2015, and mailed from the USPTO dated Oct. 14, 2016, 13 pgs.
Final Office Action for U.S. Appl. No. 14/970,318, filed Dec. 15, 2015, and mailed from the USPTO dated Jul. 11, 2017.

\* cited by examiner

POWER AND DATA ADAPTER, AND RELATED SYSTEMS AND METHODS

RELATED APPLICATIONS

This utility application claims priority to U.S. Provisional Application No. 62/069,561, entitled "POWER AND DATA ADAPTER," filed on Oct. 28, 2014, the entire disclosure of which is hereby incorporated herein by this reference.

TECHNICAL FIELD

This disclosure generally relates to electrical adapters. Specifically, this disclosure provides an adapter for combining a data interface with a power input to create a single data interface with power output.

BRIEF SUMMARY

Disclosed in some embodiments herein is an adapter to receive electrical power and data from a docking station and provide the electrical power and data to a portable electronic device. The adapter includes a power input configured to receive electrical power from a docking station, a data interface configured to communicatively couple with the docking station, and a universal non-proprietary data and power interface configured to communicatively couple with a portable electronic device. The universal non-proprietary data and power interface is also configured to operate according to a universal data communication standard to enable bi-directional data communication. The universal non-proprietary data and power interface is further configured to operate according to a universal power communication standard. The adapter also includes control circuitry in communication with the power input, the data interface and the universal non-proprietary data and power interface. The control circuitry is configured to relay communications between the docking station and the portable electronic device through the data interface and the universal non-proprietary data and power interface. The control circuitry is also configured to provide power to the portable electronic device through the universal non-proprietary data and power interface.

Disclosed in some embodiments herein is a method of providing a universal non-proprietary data and power interface. The method includes receiving electrical power from a docking station at a power interface, and receiving data from the docking station at a data interface comprising an unpowered interface. The method also includes transmitting power to a portable electronic device through a universal non-proprietary data and power interface configured to operate according to a universal power communication standard. The method further includes relaying data between the portable electronic device and the docking station through the universal non-proprietary data and power interface, wherein the universal non-proprietary data and power interface is further configured to operate according to a universal data communication standard to enable bi-directional data communication.

Disclosed in some embodiments herein is an electrical system. The electrical system includes an adapter including a power input configured to receive electrical power from a docking station, a data interface configured to receive data from the docking station, and a universal non-proprietary data and power interface configured to communicatively couple with a portable electronic device and operate according to a universal data communication standard to enable bi-directional data communication and operate according to a universal power communication standard. The adapter also includes control circuitry including a power delivery (PD) logic block communicatively coupled to the data interface, the power delivery logic block configured to negotiate, with the portable electronic device, a power level of power to be delivered to the portable electronic device through the universal non-proprietary data and power interface. The control circuitry also includes a PD power conversion block communicatively coupled to the power input, the PD logic block, and the universal non-proprietary data and power interface. The PD power conversion block is configured to convert the electrical power to the power level negotiated by the PD logic block and deliver the power to the portable electronic device through the universal non-proprietary data and power interface.

DETAILED DESCRIPTION OF PREFERRED EMBODIMENTS

Figure 1:
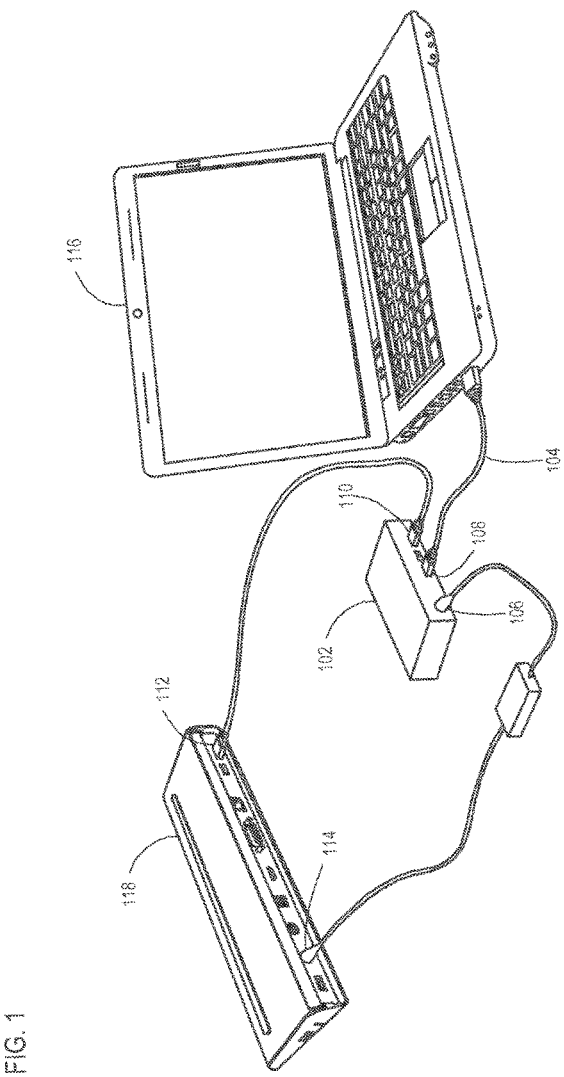
FIG. 1 is a perspective view of an adapter combining a docking station's data interface and power connection, and thereby providing a remote device with a data interface with power delivery.

An adapter may combine a data interface and a power input to create a data interface with power output. For example, an adapter may include a body with three different interfaces. A first interface may include a data interface with power output configured to communicatively couple a first remote device to the adapter, and to deliver electrical power to the first remote device. A second interface may include a second data interface configured to communicatively couple with a second remote device. The second interface may not transfer power and/or may only be able to transfer a default or minimal amount of power. As used herein, an interface without power delivery includes interfaces only able to transfer a default or minimal amount of power. A third interface may be configured to receive a power input.

The interfaces may include ports or data/power cables and may be connected to one another within the adapter. The adapter may include one or more PD logic blocks or switches configured to negotiate, via the data interface with power output, with an attached remote device on a suitable electrical power level to deliver to the attached remote device. The adapter may also include one or more power delivery ("PD") power conversion block(s) coupling the power input and the data interface with power output. In such an embodiment, the PD power conversion block(s) or switch(es) may receive electrical power from the power input and convert to the electrical power level negotiated by the PD logic block. In addition, the adapter may pass electrical communications between a device attached to the second data interface and the remote device attached to the data interface with power output. For example, as will be discussed in more detail below, the PD logic block may communicatively couple the data interface with power output and the second data interface and transparently pass electrical communications between the interfaces. In some embodiments, the first and second remote devices may transmit and receive electrical communications as if the adapter was not present. The PD logic block may also provide electrical communications to the data interface with power output for negotiating the power level to be delivered. In some embodiments, it may appear to the first remote device that it is negotiating with the second remote device over the power level to be delivered. The electrical communications to and from the first remote device and the electric power from the PD power conversion block may be combined onto a single port and/or cable. Thus, a single cable may provide data and a large amount of power to the first remote device despite the power and data being received by the adapter via separate cables.

Embodiments of the present disclosure provide and describe an adapter for combining a universal data interface and a power input to provide a universal data interface with power output. As used herein the term "universal" is given to mean usable by more than one platform. For example, a docking station, port, protocol, or interface that is used by a variety of brands of devices, a variety of types of devices, or for a variety of purposes may be referred to as a universal docking station, port, protocol, or interface.

In certain embodiments, the adapter may utilize a single or multiple universal data interface(s), tethered or untethered, to communicatively couple one remote device to another remote device (e.g., a docking station and a computer). In some embodiments, the universal data interface may be a high-speed and/or super-speed universal data interface (e.g., USB 3.0, SATA, eSATA, FireWire, DisplayPort™, Thunderbolt, Lightningbolt) or the like. In one embodiment, the universal data interface may include a WiGig, Bluetooth, WiFi, WiDi, Tri-Band, NFC, WiFi Direct, AirPlay™, or other wireless radio technologies. A universal data interface with power output may be any universal interface discussed above with the added capability of delivering variable or fixed voltage/amperage/wattage power to a remote device (e.g., a Universal Serial Bus (USB) with Power Delivery (PD)).

In further embodiments, the adapter may receive power from a DC or AC source. The electrical power may be provided in either a wired or wireless manner. For example, electrical power may be provided via a wire, cable, or other conduction point or may be provided via a radiating coil, antenna, or other wireless power coupling which induces or emits electromagnetic waves which can induce a flow of electricity in a corresponding receiving coil, antenna, or other wireless power coupling of a portable electronic device. One of skill in the art will recognize numerous methods for providing power or communicating without direct contact between devices, whether within a fixed or variable distance between devices.

Embodiments may be best understood by reference to the drawing(s), wherein like parts are designated by like numerals throughout. It will be readily understood that the components of the present disclosure, as generally described and illustrated in the drawing(s) herein, could be arranged and designed in a wide variety of different configurations. Thus, the following more detailed description of the embodiments of the systems, methods and apparatuses is not intended to limit the scope of the disclosure, but is merely representative of possible embodiments of the disclosure. In some cases, well-known structures, materials, or operations are not shown or described in detail.

FIG. 1 is a perspective view of an adapter 102 combining a docking station's data interface 112 and power connection 114, and thereby providing a remote device 116 with a data interface with power delivery 108. Power delivery enables a device to receive sufficient power through a data interface to power/charge the device. The device only requires the single cable (e.g., the cable 104) to receive power and data. The remote device 116 may be any electronic device capable of receiving a data interface with power delivery. Such devices may include, for example, a laptop, tablet, phablet, smartphone, desktop computer, monitor, speakers, etc. The adapter's interfaces 106, 108, 110 (i.e., power input and data interfaces) may be either a port, as shown, or cables. For example, in certain embodiments, the data interfaces 108, 110 may be USB ports, while in other embodiments, one or both of the data interfaces 108, 110 may be an internally connected USB cable with a USB connector for connecting directly to USB ports on remote devices.

The docking station's data interface 112 may not provide power, or the power the data interface provides may be insufficient for the remote device 116. For example, as illustrated the docking station 118 may provide for a USB interface, and the remote device 116 may be capable of receiving a USB PD. In such an example, the standard USB line from the docking station may provide around 5 volts and have a current limit of 1.5 amps. Such voltage and current may be insufficient to power/charge the remote device or might not charge the device as quickly as desired. For example, as illustrated the docking station 118 may be connected to a laptop. The docking station's standard USB line may provide around 5 volts, but this would be insufficient to charge the laptop. However, if the laptop has a USB port with power delivery, the laptop is capable of receiving much more power through the USB port.

Thus, the adapter 102 may be configured to combine a data interface with a power connection to provide sufficient power to the remote device. As illustrated, the adapter 102 may receive power from a docking station 118 via a power connection 114 coupled to a power input 106, as well as, communicate with a docking station 118 via a docking station data interface 112 coupled to an adapter data interface 110. In another embodiment, the adapter 102 may be communicatively coupled to the docking station 118 via the data interface 112, and receive power from another device (e.g., ac/dc converter coupled to mains power). The power input 106 may receive more power than the docking station's data interface 112 is capable of providing. Therefore, the adapter 102 may be configured to combine the data from the data interface 112 and power received via the power input 106 to provide a data interface with power delivery 108 capable of providing more power to the remote device 116 than could be provided by simply connecting the remote device's data interface to the docking station's data interface 112. In certain embodiments, the data interface with power delivery 108 may include a PD USB cable that may be composed of different wires. For example, a first set of one or more wires in the cable may be capable of passing the higher power (e.g., a VBus wire and/or a ground wire) and a second set of one or more wires may transmit the data (e.g., a differential pair, one or more super-speed differential pairs, etc.). The power wire (e.g., the VBus wire) and/or a dedicated wire (e.g., a configuration channel (CC) wire) in the cable may be used for negotiating the level of power to be delivered.

Figure 2:
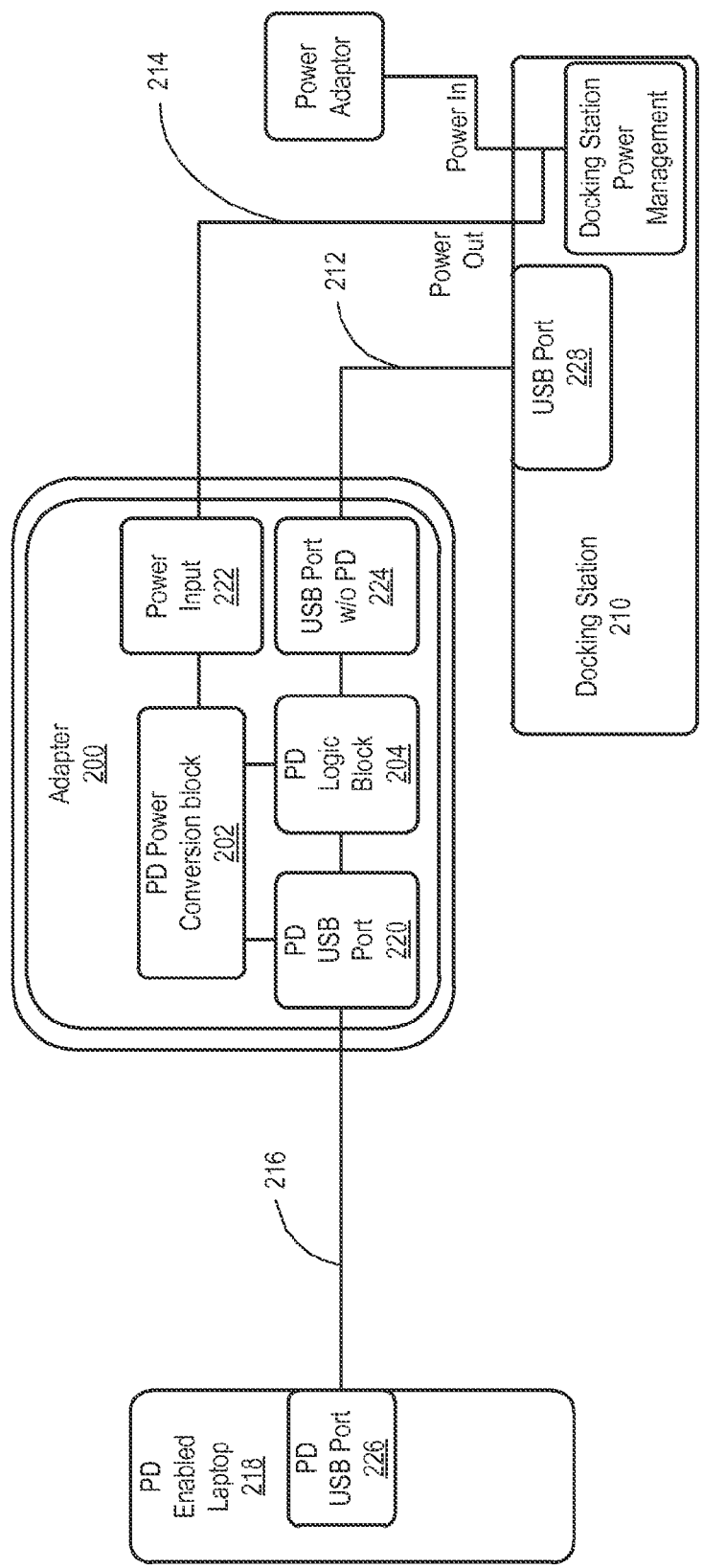
FIG. 2 is a schematic diagram of an adapter combining a docking station's data interface and power connection, and thereby providing a single data interface with power delivery to a power delivery enabled remote device.

FIG. 2 is a schematic diagram of an adapter 200 combining a docking station's data interface and power connection, and thereby providing a data interface with power delivery to a power delivery enabled remote device. For example, the adapter 200 may combine a USB connection 212 and a power out line 214 from the docking station 210, and deliver a USB line with power delivery 216 to a power delivery enabled laptop 218. A power delivery enabled device is one that can receive power through a data interface sufficient to power/charge the device. The adapter 200 may include a data interface with power delivery (e.g., PD USB port 220), a power input 222, a second data interface without power delivery 224, a PD power conversion block 202, and a PD logic block 204. With these elements, a docking station 210 without the capability of delivering more than a default power over a data line may be adapted to provide power delivery over a data line.

As illustrated, the adapter 200 may receive data and power from a docking station 210. The docking station 210 may provide data by way of a data interface without power delivery (e.g., USB port 228). This data may be received by the second data interface without power delivery 224. For example, a USB connection 212 may provide a data path between the adapter's data interface without power delivery 224 and the docking station 210. Also, the docking station 210 may provide a power out line 214 to the adapter's power input 222. The power may be received by the PD power conversion block 202. Further, the PD power conversion block 202 may detect the amount of power available to be supplied to the adapter 200. For example, the docking station's power out line 214 may provide the adapter's PD power conversion block 202 with 19.5 volts and up to 90 watts of power. The PD power conversion block 202 may be configured to read an analog or digital circuit (e.g., a power supply identification (PSID) chip) that indicates the amount of power available. The data received by the second data interface without power delivery 224 and the electric power received by the PD power conversion block 202 may be combined onto the data interface with power output 220 for distribution to the remote device (e.g., PD enabled laptop 218). For example, as illustrated, the path from the second data interface without power delivery 224 and the path from the PD power conversion block 202 are combined onto a PD USB port 220.

The data interface with power delivery may be configured to communicatively couple a remote device to the adapter 200, and, if the remote device is power delivery enabled, to deliver electrical power to the remote device. For example, in certain embodiments, a power delivery enabled laptop may be connected to the data interface with power delivery via a PD USB port 226. This PD USB connection may provide both communication data and power to the laptop. In certain embodiments, to pass the data and power, the USB line with power delivery 216 connecting the adapter PD USB port 220 to the remote device may include a VBus wire and one or more data wires. In such an embodiment, a first set of wires in the cable may be capable of passing the higher power (e.g., the VBus wire) and a second set of wires may transmit the data (e.g., the data wires).

The data received by the adapter 200 from either the remote device (e.g., the PD enabled laptop 218 or the docking station 210) may be transparently passed between the data interfaces 220, 224 and through the PD logic block 204. Transparently passing information may refer to passing through all information from one port to another without alteration. For example, an attached laptop may send a signal representing a keystroke to the adapter. This signal may contain more than just the keystroke data. For example, a header may be included within the sent signal. In such an embodiment, the adapter 200 may receive the signal and then pass the signal, including the header, through to the attached device.

When a remote device is coupled to the adapter 200, the PD logic block 204 may negotiate with the remote device, via the data interface with power output, on a suitable electrical power level to deliver to the remote device. For example, when a user connects a laptop 218 to the adapter 200 via a PD USB port 220, the PD logic block 204 may send a source capabilities signal to the laptop 218 indicating how much power can be provided. In response, the laptop 218 may then send a request indicating the amount of power required to charge/power it. The power may be specified as a voltage, a current, a power, and/or the like. The PD logic block 204 may then instruct the PD power conversion block 202 to provide an appropriate level of power. As illustrated, the PD logic block 204 may couple the data interfaces 220, 224 to one another as well as being coupled to the PD power conversion block 202. This may allow the PD logic block 204 to utilize the PD USB port 220 to negotiate a level of power to be delivered with the laptop 218 and to remove such negotiations from communications with the docking station 210. The PD logic block 204 may also be able to control operation of the PD power conversion block 202 based on the negotiations.

Figure 3:
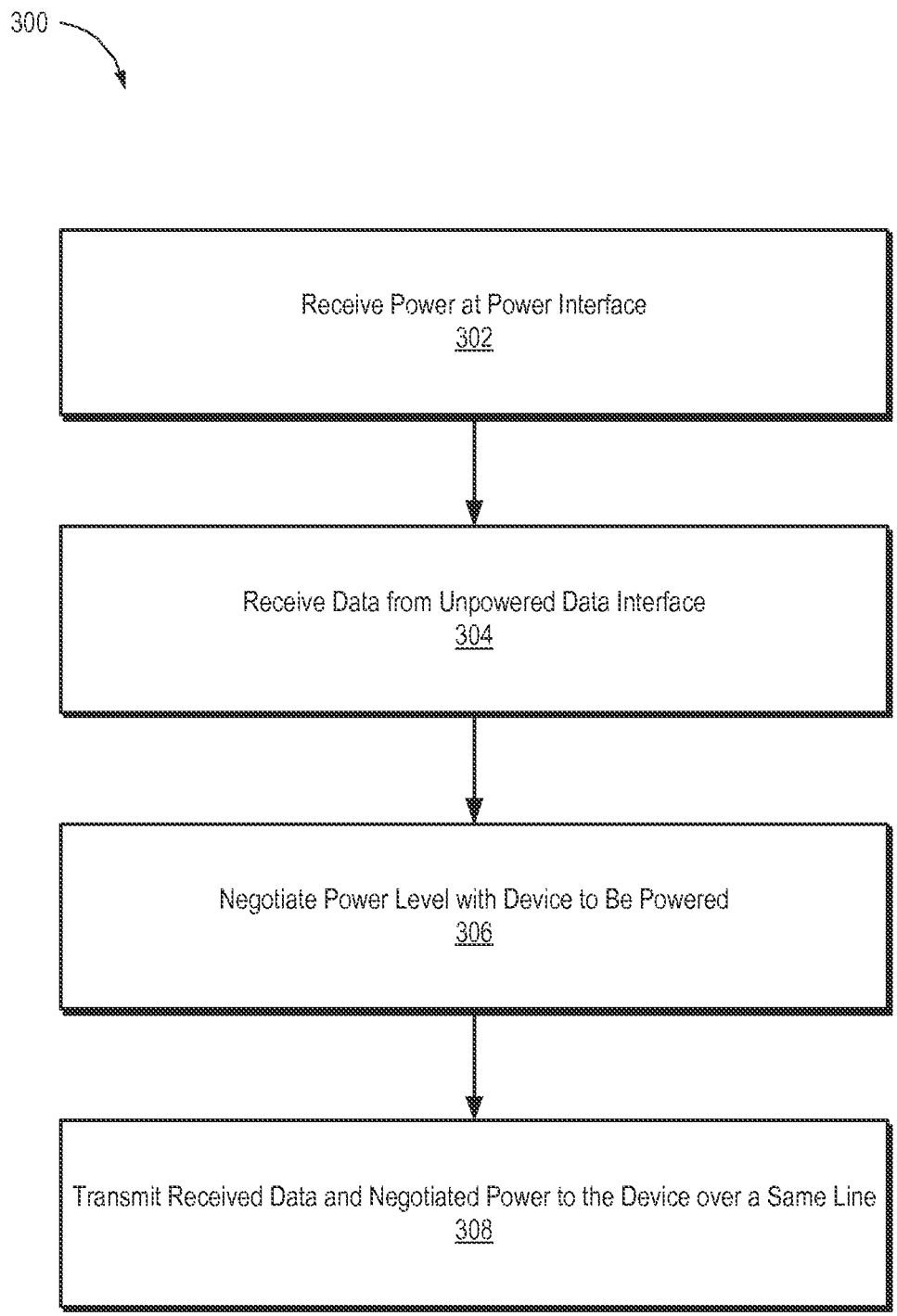
FIG. 3 is a flow diagram of a method for combing a power interface and unpowered data interface to create a powered data interface.

FIG. 3 is a flow diagram of a method 300 for combing a power interface and unpowered data interface to create a powered data interface. As used herein, the term "unpowered interface" refers to interfaces that do not include power, and interfaces that include power that is insufficient to power a device to be powered by the powered data interface. The elements of the method are provided in no particular order and may be rearranged as would be technically feasible.

An adapter may receive 302 power at a power interface. For example, the adapter may receive DC power delivered via a DC interface that is standard for one or more laptops. The adapter may detect the amount of power available to be supplied to the adapter. The amount of power available may be detected by testing the amount of voltage and/or current delivered and/or by reading an analog or digital circuit (e.g., a PSID chip) providing information about the amount of power available. Also, the adapter may receive data 304 from an unpowered data interface. By way of non-limiting example, the data interface may be a data interface that provides a default or minimum amount of power.

The adapter may negotiate 306 a power level to be provided with the device to be powered and transmit 308 the received data and negotiated power to the device over a same line. For example, an adapter may be connected with a laptop by way of a PD USB cable. The PD USB cable may include a VBus line and Data lines that may be separate wires in the cable. The adapter may negotiate the power over the VBus line or a CC wire. The adapter may send a source capabilities message to the laptop advertising the capabilities of the adapter (e.g., the amount of power it can provide). The laptop may send a request message requesting a specific amount of power. The adapter may send an accept message to acknowledge the request message. The adapter may finally send a PS_RDY message signaling that the adapter is ready to provide the negotiated power. Then, the adapter may provide the negotiated power to the device. The adapter may additionally communicate with the cable (e.g., with cable plugs) to determine limits on cable capabilities. The adapter may transmit received data to the device while negotiations are taking place. The adapter may also receive data at the power interface and transmit it via the unpowered interface.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims.

What is claimed is:

1. An adapter to receive electrical power and data from a docking station and provide the electrical power and data to a portable electronic device, the adapter comprising:
    a power input comprising a first electrical connector and configured to receive electrical power from a first electrical connector of a docking station;
    a data interface comprising a second electrical connector separate from the first electrical connector and configured to communicatively couple with a second electrical connector of the docking station;
    a universal non-proprietary data and power interface comprising a single electrical connector and configured to communicatively couple with a single electrical connector of a portable electronic device, and configured to operate according to a universal data communication standard to enable bi-directional data communication and further configured to operate according to a universal power communication standard; and
    control circuitry in communication with the power input, the data interface, and the universal non-proprietary data and power interface, the control circuitry configured to:
        relay communications between the docking station and the portable electronic device through the data interface and the universal non-proprietary data and power interface; and
        provide power to the portable electronic device through the universal non-proprietary data and power interface, wherein the power provided to the portable electronic device is derived from the electrical power received through the power input and not from the data interface.

2. The adapter of claim 1, wherein the control circuitry comprises a power delivery (PD) logic block communicatively coupled to the universal non-proprietary data and power interface and configured to negotiate, through the universal non-proprietary data and power interface, with the portable electronic device to determine a proper converted power to provide to the portable electronic device through the universal non-proprietary data and power interface.

3. The adapter of claim 2, wherein the PD logic block is further configured to transmit a source capabilities signal to the portable electronic device through the universal non-proprietary data and power interface, the source capabilities signal indicating an amount of power that can be provided through the universal non-proprietary data and power interface.

4. The adapter of claim 1, wherein the control circuitry comprises a power delivery (PD) power conversion block communicatively coupled to the power input and configured to convert the electrical power received from the docking station to the power to be provided to the portable electronic device.

5. The adapter of claim 4, wherein the PD power conversion block is further configured to detect an amount of power available to be supplied by the docking station communicatively coupled to the power input.

6. The adapter of claim 1, wherein the control circuitry is further configured to pass the data communications between the docking station and the portable electronic device transparently.

7. The adapter of claim 1, wherein the universal non-proprietary data and power interface is configured to communicatively couple to a second portable electronic device of a different brand than the portable electronic device.

8. The adapter of claim 7, wherein the portable electronic device and the second portable electronic device are different types of devices.

9. The adapter of claim 8, wherein the portable electronic device and the second portable electronic device comprise two of a laptop, a tablet, a phablet, and a smartphone.

10. A method of providing a universal non-proprietary data and power interface, the method comprising:
    receiving electrical power from a first electrical connector of a docking station at a power interface comprising a first power interface;
    receiving data from a second electrical connector of the docking station at a data interface comprising a second electrical connector separate from the first electrical connector, the data interface comprising an unpowered interface;
    transmitting power to a single electrical connector of a portable electronic device through a universal non-proprietary data and power interface comprising a single electrical connector configured to operate according to a universal power communication standard, wherein the power transmitted to the single electrical connector is derived from the electrical power received from the first electrical connector of the docking station and not from the second electrical connector of the docking station; and
    relaying data between the portable electronic device and the docking station through the single connector of the universal non-proprietary data and power interface, wherein the universal non-proprietary data and power interface is further configured to operate according to a universal data communication standard to enable bi-directional data communication.

11. The method of claim 10, further comprising detecting an amount of power that is available to be received at the power interface.

12. The method of claim 11, wherein detecting an amount of power that is available to be received at the power interface comprises testing the electrical power received at the power interface.

13. The method of claim 11, wherein detecting an amount of power that is available to be received at the power interface comprises reading a circuit of a power source communicatively coupled to the power interface, the circuit configured to provide information about the amount of power that is available.

14. The method of claim 10, wherein transmitting power to a portable communication device comprises:
- transmitting a source capabilities message to the portable electronic device, the source capabilities message indicating an amount of power that can be provided;
- receiving a request message from the portable electronic device, the request message requesting a specific amount of power;
- transmitting an accept message to the portable electronic device, the accept message acknowledging that the request message was received; and
- transmitting a ready message to the portable electronic device, the ready message indicating that the power is ready to be supplied to the portable electronic device through the universal non-proprietary data and power interface.

15. An electrical system, comprising:
an adapter comprising:
- a power input comprising a first electrical connector and configured to receive electrical power from a first electrical connector of a docking station;
- a data interface comprising a second electrical connector separate from the first electrical connector and configured to receive data from a second electrical connector of the docking station;
- a universal non-proprietary data and power interface comprising a single electrical connector and configured to communicatively couple with a single electrical connector of a portable electronic device and operate according to a universal data communication standard to enable bi-directional data communication and operate according to a universal power communication standard; and
control circuitry comprising:
- a power delivery (PD) logic block communicatively coupled to the data interface and the universal non-proprietary data and power interface, the power delivery logic block configured to negotiate, with the portable electronic device, a power level of power to be delivered to the portable electronic device through the universal non-proprietary data and power interface; and
- a PD power conversion block communicatively coupled to the power input, the PD logic block, and the universal non-proprietary data and power interface, the PD power conversion block configured to convert the electrical power to the power at the power level negotiated by the PD logic block and deliver the power to the portable electronic device through the universal non-proprietary data and power interface, wherein the power is converted from the electrical power and not from power received through the data interface.

16. The system of claim 15, further comprising the docking station.

17. The system of claim 16, wherein the docking station comprises:
- a power output configured to communicatively couple to the power input of the adapter and deliver the electrical power to the power input; and
- a docking data interface configured to communicatively couple to the data interface and communicate with the portable electronic device through the data interface and the universal non-proprietary data and power interface.

18. The system of claim 15, further comprising the portable electronic device, wherein the portable electronic device includes an electronic device capable of receiving a data interface with power delivery.

19. The system of claim 18, wherein the electronic device comprises a laptop computer.

20. The system of claim 15, wherein the control circuitry is further configured to pass the data communications between the docking station and the portable electronic device transparently.

* * * * *